United States Patent [19]

Herbert

[11] Patent Number: 5,180,192

[45] Date of Patent: Jan. 19, 1993

[54] LOST PERSONAL ACCESSORY ITEM IDENTIFICATION AND RETURN METHOD AND ARTICLES

[76] Inventor: William S. Herbert, 9515 Admiral Lowell NE., Albuquerque, N. Mex. 87111

[21] Appl. No.: 516,677

[22] Filed: Apr. 30, 1990

[51] Int. Cl.⁵ .......................................... B42D 15/00
[52] U.S. Cl. .................................... 283/101; 283/117; 283/81; 283/80; 283/70; 40/634; 235/382.5
[58] Field of Search ...................... 283/117, 85, 86, 80, 283/81, 98, 99, 76, 74, 75, 73, 88, 114, 904, 107, 67, 70; 40/634, 642, 634; 235/381, 382.5, 492, 634; 364/200

[56] References Cited

U.S. PATENT DOCUMENTS

| | | | |
|---|---|---|---|
| 450,427 | 4/1891 | Schell | 283/73 |
| 2,200,454 | 5/1940 | Rahn | 40/634 X |
| 2,213,075 | 8/1940 | Ross | 40/634 X |
| 2,865,120 | 12/1958 | Hines | 40/634 |
| 3,094,799 | 6/1963 | Hines | 40/634 |
| 3,906,447 | 9/1975 | Crafton | 235/382.5 |
| 4,120,452 | 10/1978 | Kimura et al. | 235/391 R |
| 4,271,352 | 6/1981 | Thomas | 283/88 |
| 4,336,754 | 6/1982 | Loeb | 283/74 |
| 4,995,642 | 2/1991 | Juszak et al. | 283/105 |

Primary Examiner—Paul A. Bell

[57] ABSTRACT

A method and articles by which registered lost personal acessory items such as keyrings containing keys can be returned by U.S. Mail to their owner without compromise of security, consisting of an identification tag with a unique barcode indicia or similar identifier, a registration card with identical barcode and owner-written address information requiring no transcription, and a central registry capable of entering, storing, and retrieving one from among an unlimited number of registrations by laser and computer technology, with separate, redundant storage methods for registry protection.

1 Claim, 6 Drawing Sheets

LOST PERSONAL ACCESSORY ITEM IDENTIFICATION AND RETURN METHOD AND ARTICLES

BACKGROUND OF THE INVENTION

1. Field of the Invention

The invention relates generally to an efficient method by which lost personal accessory items such as keyrings containing keys can be returned via U.S. Mail to their owner without breach of security.

2. Description of the Prior Art

Simple keyring identification devices affixed to a keyring have been in common use for many years. The most common type identifies either the owner directly or the premises accessed by the key, such as a hotel room; these compromise security when misplaced or if stolen. An earlier type recalled by the applicant was a replica of one's automobile license plate which appeared in the 1950s which could then be traced back to the owner through a state motor vehicle department. A third, of similar concept as the present invention but impractical for commercial mass use, is provided by an automobile manufacturer to some car purchasers as a gratuity; it is of cumbersome design, subject to disintegration over time and use, and incapable of commercially efficient implementation. This invention eliminates all of the foregoing problems and shortcomings.

The following prior art references are pertinent to the invention:

U.S. Pat. No. 4,180,284 to Ashley
U.S. Pat. No. 4,403,487 to Marty
U.S. Pat. No. 4,336,754 to Loeb
U.S. Pat. No. 450,427 to Schell
U.S. Pat. No. 4,601,185 to Sheldon
U.S. Pat. No. 1,653,581 to McKellar
U.S. Pat. No. 2,200,454 to Rahn
U.S. Pat. No. 2,759,280 to Schlage
U.S. Pat. No. 4,271,352 to Thomas Rahn describes the license plate replica described earlier in this section. Ashley concerns return of luggage and Schell of watches. Marty, Sheldon, McKellar and Schlage each place an indicia on an individual key rather than on a keyring. Loeb is a general property identifier.

Thomas, and the patents referenced therein, discloses a property return system including as one of its several claims a barcode identifier. However it is distinguishable in relying solely on an internet banking system as the initial return point and a profitable reward system for both the property finder and the bank internet after the loss and find occur. The present invention is without a finder reward system and utilizes the entire system of common U.S. Mail deposit boxes as its initial return point. Although Thomas states its system will become "an important profit generation center for banking and credit institutions in the next decade," such does not appear to have materialized since its patent issued in 1979, and the system appears to nave been abandoned.

Additionally, Thomas places within the identification device significant data concerning the owner, whereas the present invention does not.

SUMMARY OF THE INVENTION

The barcoded indicia is unique from all other barcodes in the system, and distinguishable therefrom; the barcode indicia is otherwise unidentifiable to the owner or to the premises accessed by the keys, except through the single computer memory bank at the system's registry into which the registration card's barcode indicia has earlier been laser-entered. The computer memory entry allows later identification to the filed original registration card, which alone bears the name and address of the owner-registrant; or to a secondary microfilm or microfiche copy of the registration card, maintained by the registry in the same sequential order as the filing of the original registration card but at a different physical location for additional security against destruction of the entire identification system. The device on the keyring is of durable, firm material containing both the aforementioned barcode indicia and a printed direction to the lost keys' finder to drop in any mailbox, and that return postage is guaranteed to the imprinted mailing address of the central registry, such being specifically permitted by United States Postal Service regulation.

It is an object of the invention to identify an unlimited number of keyrings to each one's specific owner in an inexpensive manner, to provide non-compromise of security while the keys are lost, and through dual mailings to and from a central registry, to efficiently return the keys to their proper owner.

DESCRIPTION OF THE PREFERRED EMBODIMENT

Figure 1:
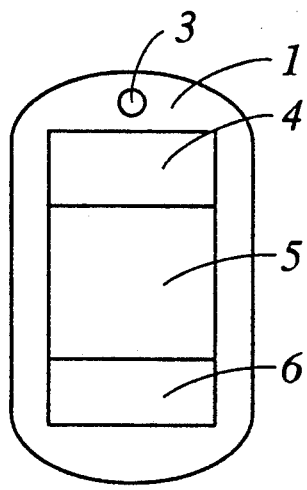
FIG. 1 and 1a are views of the obverse of two typical configurations of the device to be attached to the keyring in the Lost Keyring Identification and Return System, the precise configuration being immaterial to the system.
Figure 1A:
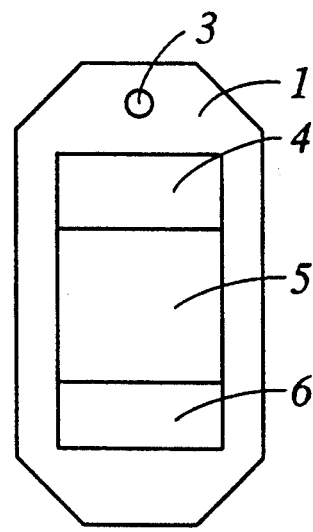
Figure 2:
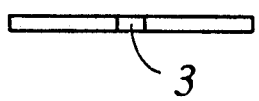
FIG. 2 and 2a are sectional views of FIG. 1 and 1a, respectively.
Figure 2A:
Figure 3:
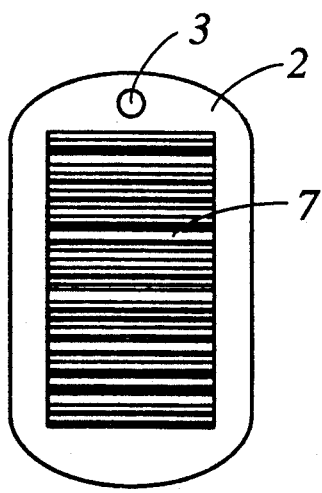
FIG. 3 and 3a are views of the reverse of the device in FIG. 1 and 1a, respectively.
Figure 3A:
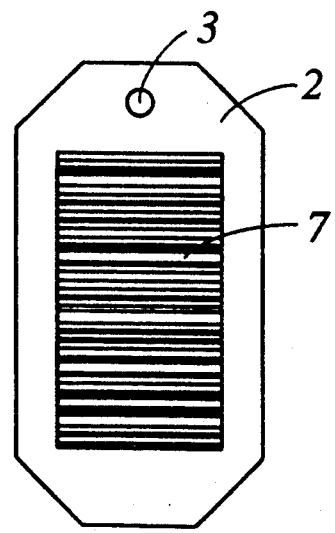
Figure 4:
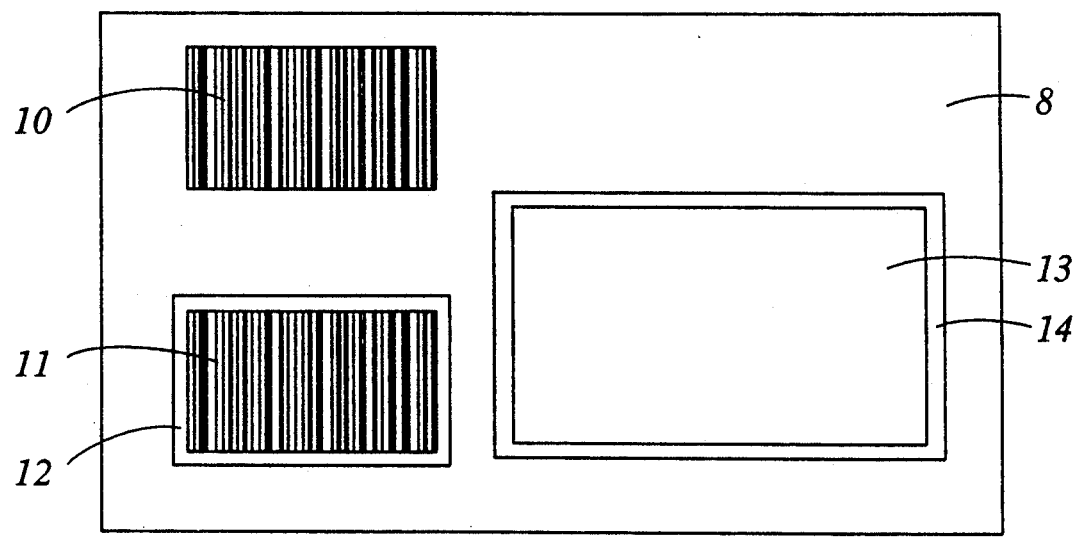
FIG. 4 is a view of the reverse side of the registration card employed in the Lost Keyring Identification and Return System.
Figure 5:
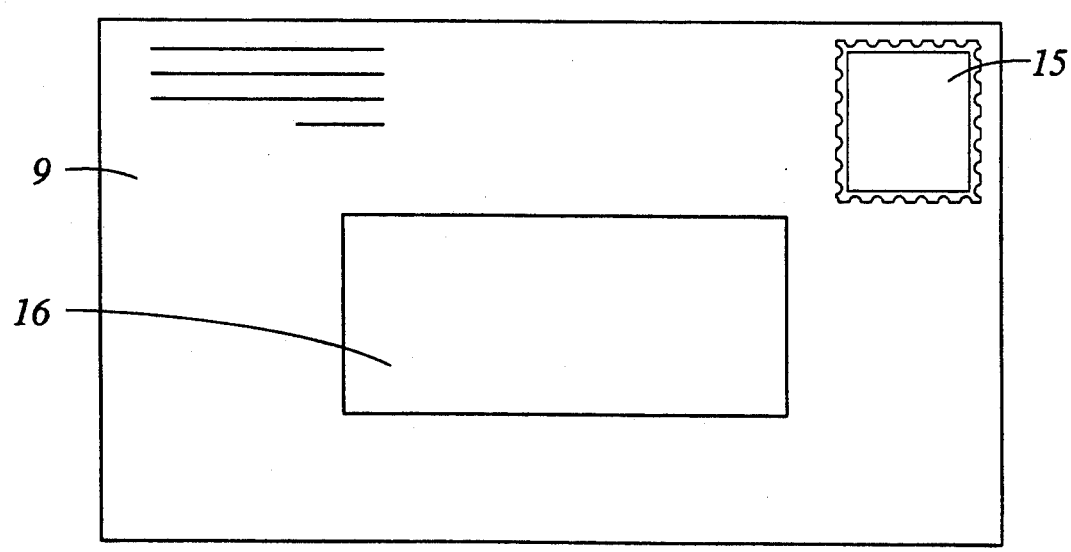
FIG. 5 is a view of the obverse side of the registration card in FIG. 4.
Figure 6:
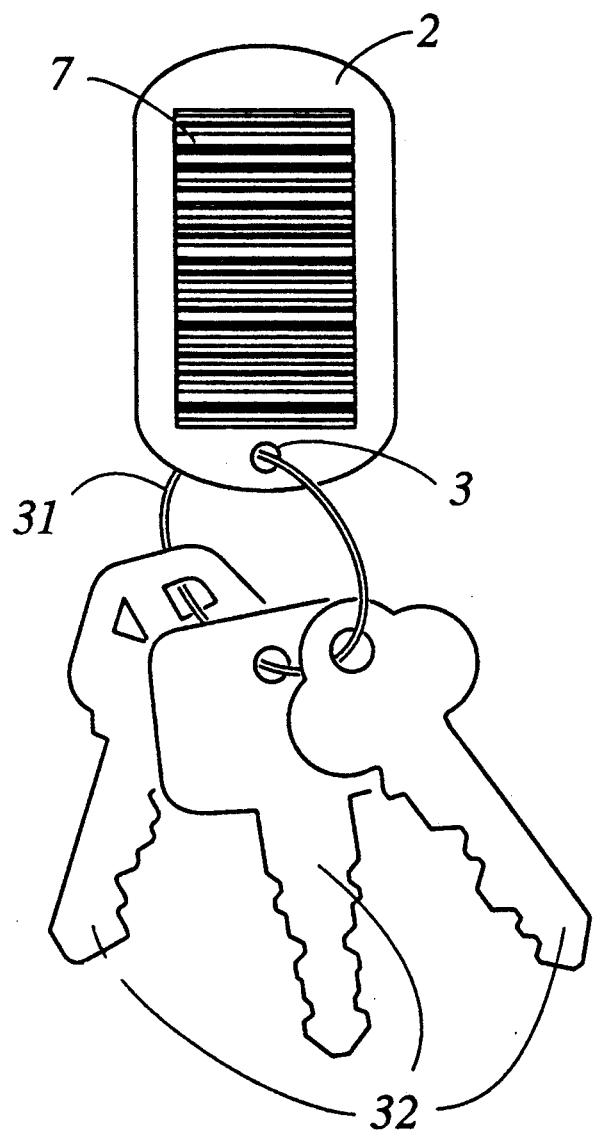
FIG. 6 is a depiction of a common ring of keys with the device in FIG. 3 affixed as in use.

Referring to FIG. 1 through FIG. 9, an embodiment of the Lost Keyring Identification and Return System is shown. In this embodiment an identification device of the type shown in FIGS. 1, 2, and 3, or alternatively in FIGS. 1a, 2a, and 3a, with precise shape or material of composition immaterial but lightweight metal being preferred, is affixed by means of hole 3 to the ring feature, 31, of a common keyring, as is depicted in FIG. 6. FIG. 1 embodies said metal tag device, consisting of planar surface 1, and the following three fields for the display of written information: 4 is the preferred location for the phrase "IF FOUND DROP IN ANY MAILBOX", or functionally similar phrase; 5 is the preferred location for the written mailing address of the location of the system's central registry; and 6 is the preferred location for the phrase "RETURN POSTAGE GUARANTEED", or similar phrase acceptable to the U.S. Postal Service. The writings contained at 4, 5 and 6 may be engraved in or painted on the planar surface 1, or preferably may be printed on a label with pressure-sensitive adhesive for later permanent placement and bonding on 1. FIG. 2 depicts a cross-sectional view of FIGS. 1 and 3, longitudinally. The precise thickness of the device, as depicted in FIG. 2, is immaterial to the function of the system, but is dependent on the material selected for fabrication of the device. The preferred embodiment is a metal device of thickness approximately 1/32", with edges not sharp. Hole 3 is of sufficient diameter as to allow it to encompass any common keyring which may be placed through it, in similar manner and direction as does the hole in a common key. Hole 3 shall be pierced through the device at right angles to planar surfaces 1 and 2 so as to allow the device to position itself on a keyring with its planar surfaces parallel to the planar surfaces of the keyring's mounted keys, this to achieve economy of space on the keyring. FIGS. 3 and 3a depict the reverse side of FIGS. 1 and 1a, respectively. 2 is the planar surface opposite 1. The barcode may be of any one of the several barcode formats now in being or which may be devised in the future. The preferred embodiment contains no depiction of arabic digits appearing on the label, however the presence or absence of such is of no effect on the operability of the system constituting the invention. The particular barcode depicted at position 7 is not at said location until removed manually from its originally-manufactured location 11 on the registration card and manually affixed by its pressure-sensitive adhesive backing to its permanent location 7 by the owner of the keyring. The number of digits represented on the barcode may vary, depending on the capacity of the number of keyrings to be registered in the system; the preferred embodiment is ten or more. FIGS. 4 and 5 depict an embodiment of the postcard-type registration apparatus in the system. 8 represents the reverse side of the card, and 9 the obverse side. 8 in addition to the component items shown in FIG. 4 may contain procedural instructions to the keyring owner for proper implementation of the system. 10 depicts a permanently printed, nonremovable barcode matching precisely that in position 11 (and later 7) and throughout the drawings. 12 depicts a waxpaper-type field on the cardboard surface of 8 and upon which adhesively-backed barcode label 11 is initially and semi-permanently affixed at manufacture, later to be removed and moved to 7 by the keyring owner as earlier described. 14 similarly is a waxpaper-type field, upon which is placed semi-permanently at manufacture the adhesive-backed label stock depicted at 13. Unlike 11 however, label 13 continues to remain semi-permanently located on card 8, at location 14, and only later is removed and relocated by registry personnel when return of lost keys to the owner actually becomes necessary. As stated above, when necessary to return the lost keyring from the registry to the owner, label 13 will be removed from waxpaper-type backing 14 on card 8 and will be placed instead on the return mailer-box or mailer package depicted in FIG. 9 at location 34. This label, in the owner's own handwriting, assures proper return without transcription error. FIG. 5, depicting the obverse side of the registration card-apparatus, contains the mailing information by which the registration is mailed by the keyring owner to the registry. At location 16 is preprinted the mailing address of the registry, preferably the same U.S. Post Office and optionally the same post office box as appears at 5 on the keyring device in this preferred embodiment. Location 15 is reserved for proper mailing postage for the registration card-apparatus to reach the registry location; in this embodiment, postage may be affixed by the owner or be pre-printed and pre-paid by the registry. FIG. 6, as stated earlier, depicts the configuration of the identification device shown in FIGS. 1, 2, and 3 once label 11 has been affixed thereto as label 7 by the keyring owner and once said device has been affixed to the protected keyring, partially achieving the object of this invention. 31 depicts generally a common keyring device upon which have been placed 32 a varying amount of common keys intended to open locks or activate apparatuses of the owner. The specific type of keyring 31 upon which keys and the identification device of FIGS. 1, 2, and 3 is placed is not limited in this preferred embodiment, and any such keyring or other keyholder amenable to receipt of said device by hole 3, or other similar artifice by the keyring owner and permissible of mail carriage under postal regulations, is contemplated in this invention. Additionally, the invention contemplates the application of the system to the return of any other objects similar to keys which are allowed by postal regulations to be so returned to a specified location by the aforementioned indicia 4 and postage guarantee 6, and to which an owner has affixed the described identification device in an acceptable fashion; in such case the registration and operation of the system is identical in basic respects. However, the primary object of the invention is the return of keys.

Figure 7:
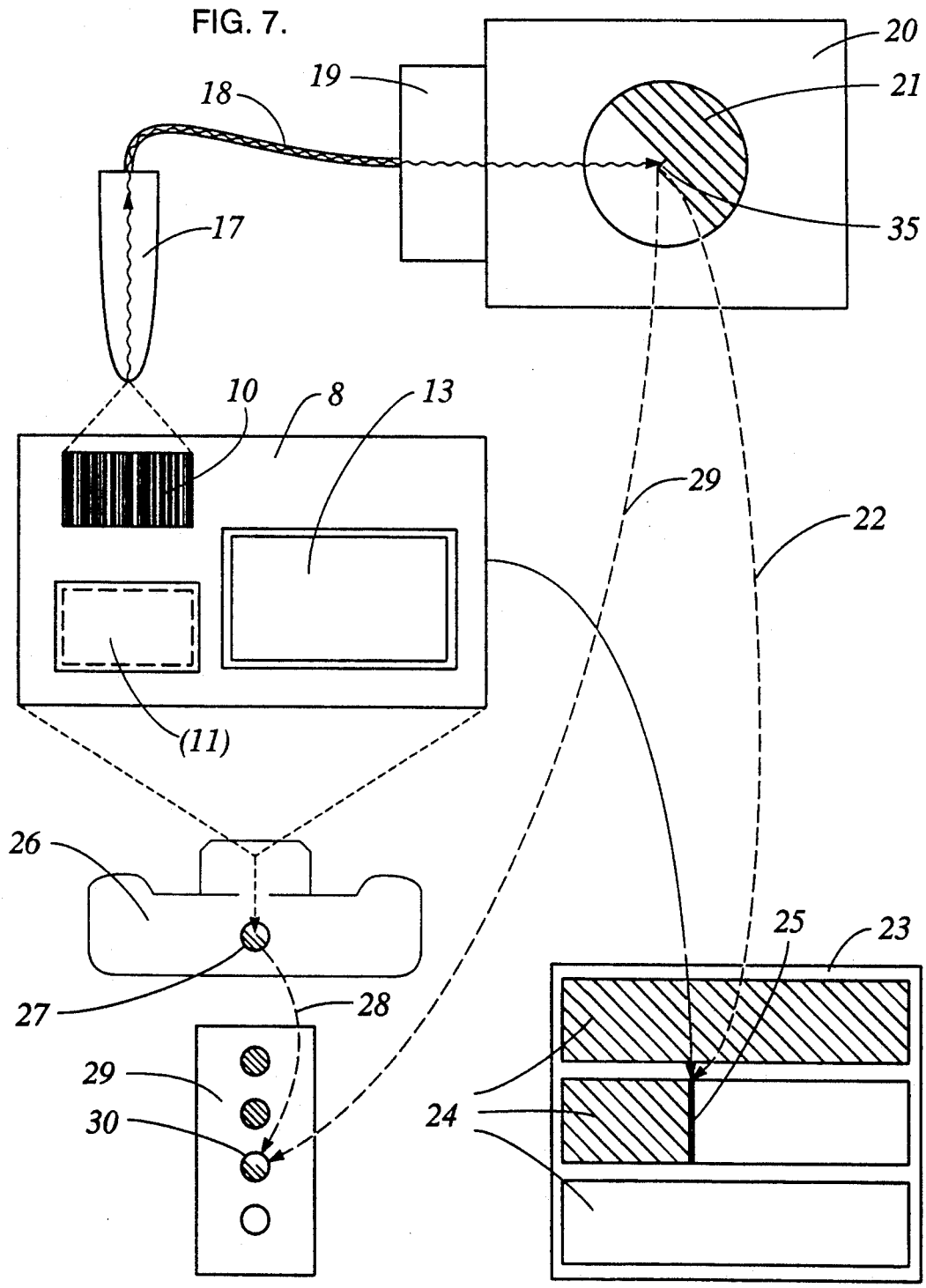
FIG. 7 is a flow diagram depicting entry and storage of identification information in the Lost Keyring Identification and Return System.

FIG. 7 depicts in diagrammatic fashion the entry of registration information into the system's registry, which is one of the features of this invention absent from any other known embodiment or concept, and which affords the invention both efficiency in administration and maximum freedom from transcription or identification error. 8 and its appurtenances 10, (11) and 13 represent FIG. 4 which has been properly modified by the keyring owner per directions, including the removal of (11) to location 7 and the completion of label 13 with the owner's name and return mailing address. Upon receipt of this card-apparatus at the registry by mail, it is promptly registered and catalogued by a sequence of laser-read, computer-identified, and photographically and manually stored processes, hereinafter described. The laser encoding/decoding device, a wand-scanner or other similar apparatus depicted at 17, is used to scan through cable 18 into a wedge reader 19 which interfaces with a common computer having memory storage and retrieval. In the preferred embodiment, the memory, depicted here as 21, is of a laser-disc type with significantly greater storage capacity than other magnetic storage discs. The laser-read and -entered number from barcode 10 is recorded in the computer memory as to its date of entry and numeric sequence of entry amongst other entered barcodes on that date. This is depicted in FIG. 7 as point 35, with the shaded portion of 21 representing the used computer memory, and the unshaded portion the unused and available memory, not necessarily proportional. Detached item 26 represents a microfilm or microfiche camera apparatus which is then used to photograph the entire reverse-side surface of card 8, also in the same sequence of receipt as the laser-read computer entry, said ordered entry represented at a point on the specific roll of microfilm or card of microfiche at 30, with shaded indicia again depicting used capacity and unshaded depicting unused. This microfilm/microfiche aspect of the system is a part of the preferred embodiment for purposes of a secure back-up recordation of the entire registry, but is an optional aspect of the systems functionability. The identification link between the computer and the microfilm/microfiche, capable of later reference, is depicted as path 29. Upon completion of the microfilm/microfiche recording process, card-apparatus 8 is then manually filed in a large physical storage system depicted at 23. Individual storage boxes or drawers are represented by 24, and the card-apparatus is filed in precise sequential order of receipt, depicted at location 25, with shaded areas representing used storage and unshaded representing unused storage capacity. The identification link between the computer memory 21 and the manual filing/storage system is depicted by path 22, again as with the microfilm/microfiche path 29, for later reference when lost keys, FIG. 6, have been mail-returned by a finder and the U.S. Postal Service to the registry. The inherent ability of the computer memory to record and store data which has been received and entered in random number order, and to later retrieve it on demand is another feature of this invention rendering it practical and efficient from other such known systems earlier discussed. At this point in the description of the preferred embodiment all functions have been completed to insure the proper identification of lost keys which may later be received by mail at the registry.

Now in the description it must be hypothesized that the previously discussed set of keys on its keyring with identification device, FIG. 6, has been lost or mislaid by its owner, and has been found by another person who examines them, notices the identification device affixed, gratuitously complies with the direction thereon, and drops them into a U.S. Mail depository box. No further effort is required of the finder, and the security of the identity of the keys' owner and the premises to which the keys relate has not been compromised. This is a feature of the invention not appearing in most of those earlier described above.

Figure 8:
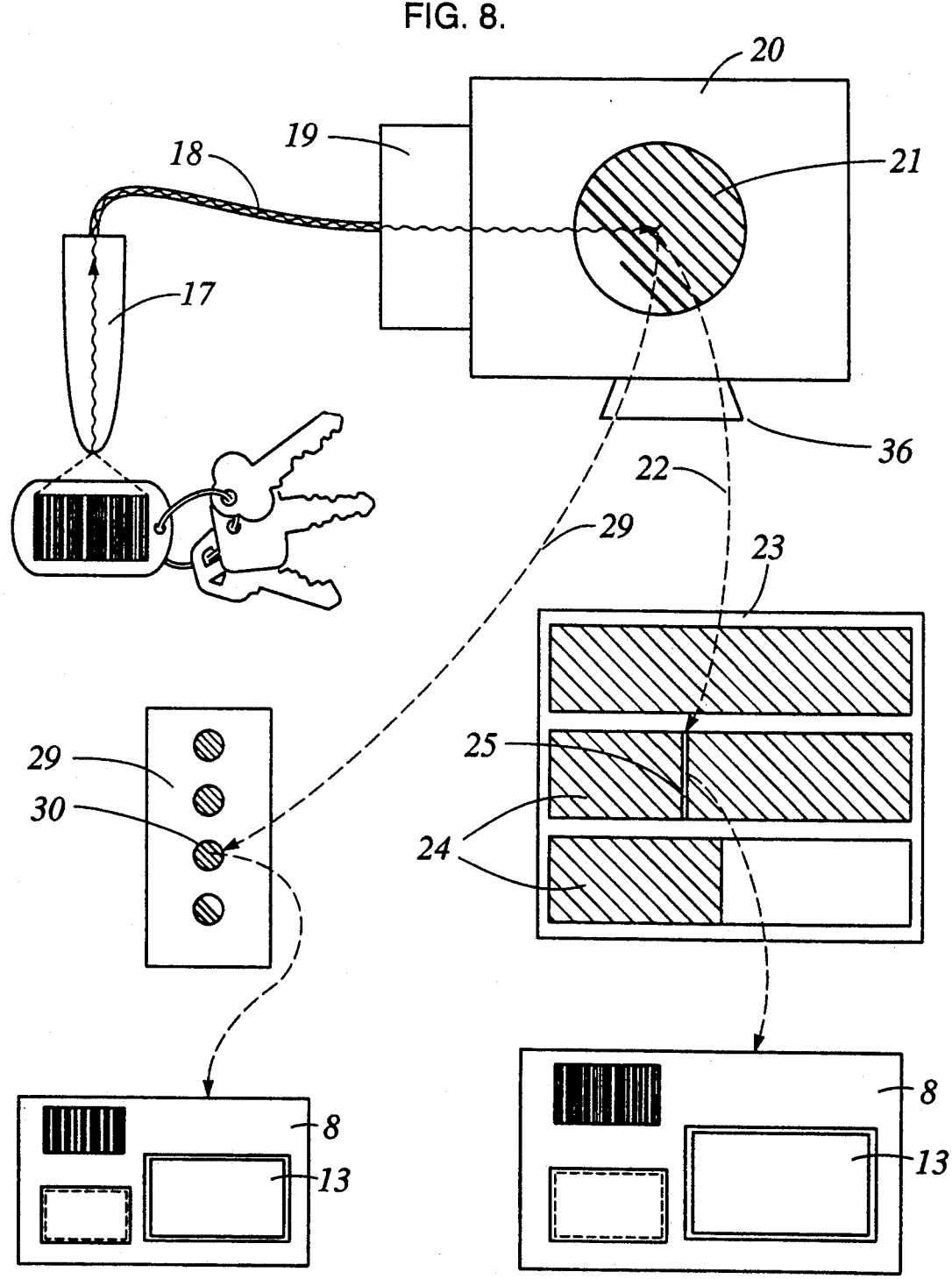
FIG. 8 is a similar flow diagram depicting decoding and retrieval of identification information in the Lost Keyring Identification and Return System.
Figure 9:
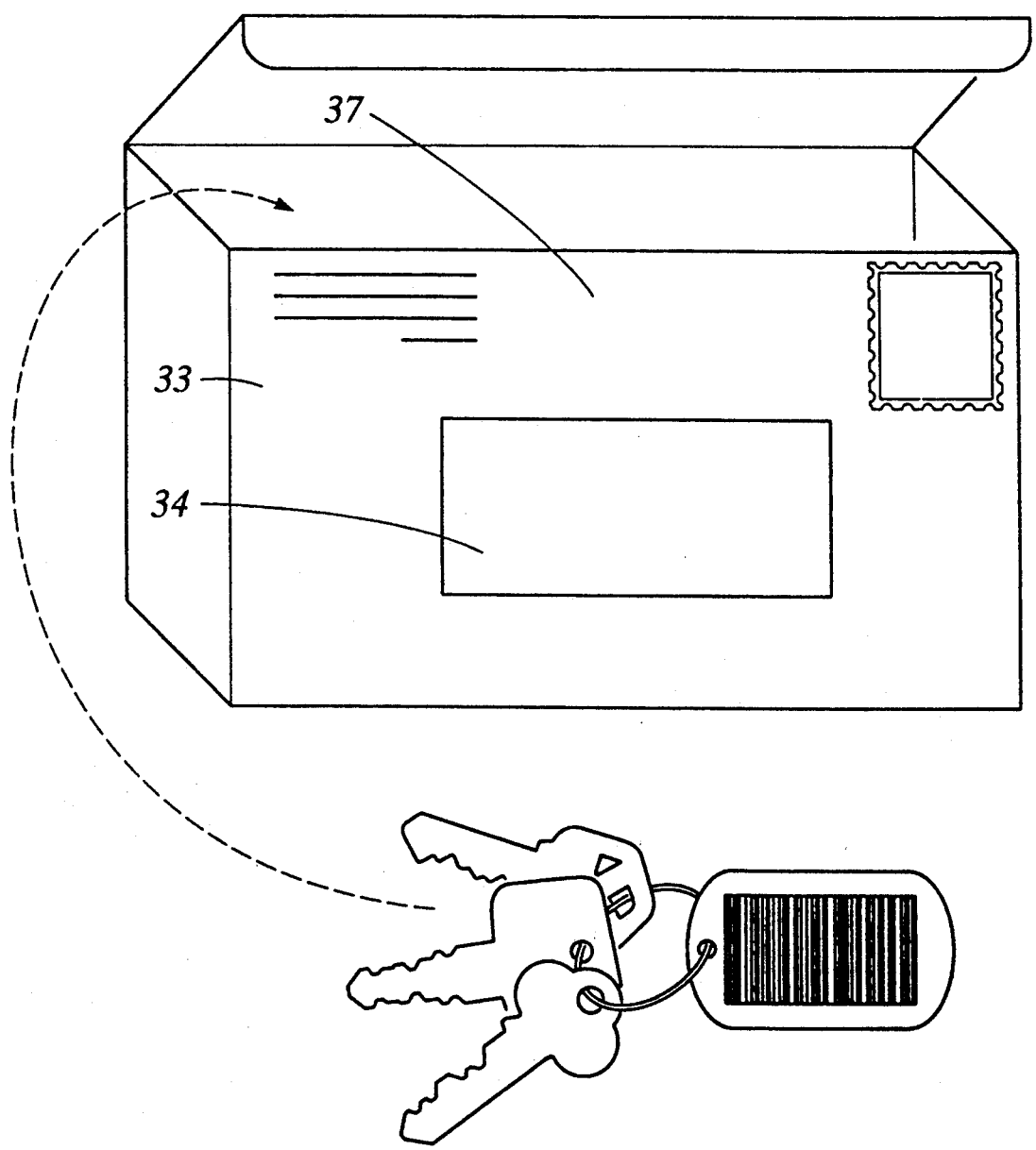
FIG. 9 is a depiction of the means of keyring return in the Lost Keyring Identification and Return System.

Referring to FIG. 8, time has passed since the initial registration depicted in FIG. 7, and more registrations have been added to the computer storage 21, the microfilm/microfiche storage 29, and the manual storage 23; each of these is shown by increased shading in their respective systems. Upon receipt of the registered keys, keyring, and identification device FIG. 6, the unique barcode is laser-scanned by 17 in the decode mode and the information identifying its date and sequence number of receipt is outputted through computer videoscreen terminal 36 which enables the operator to locate the corresponding microfilm/microfiche of the photographed replica registration card 8, and also to locate the original manually-filed registration card at its precise storage point. These two redundant paths are again depicted at 29 and 22, respectively. Field 13 on each version identifies the owner and his/her address as originally registered. Referring now to FIG. 9, the registry operator can simply place the lost keyring and keys in a mailing box 37, remove from its waxpaper-type backing 14 the originally written address label 13, and affix said label to mailing box 37 by its pressure-sensitive adhesive, add postage, and mail the keyring to its owner. The object of the invention, the return of lost keys to the owner with accuracy, efficiency, and without breach of security, has been accomplished.

I claim:
1. A mailable card containing
   (a) the address of a central registry,
   (b) a peel-off and reaffixable adhesive label upon which can be written the name and mailing address of a registrant,
   (c) a peel-off and reaffixable adhesive label upon which appears a barcode label identifier,
   (d) a printed barcode matching said barcode label identifier.

* * * * *